B. H. ANIBAL.
STEERING AND CONTROL MECHANISM FOR MOTOR VEHICLES.
APPLICATION FILED MAY 5, 1919.
1,324,782. Patented Dec. 16, 1919.
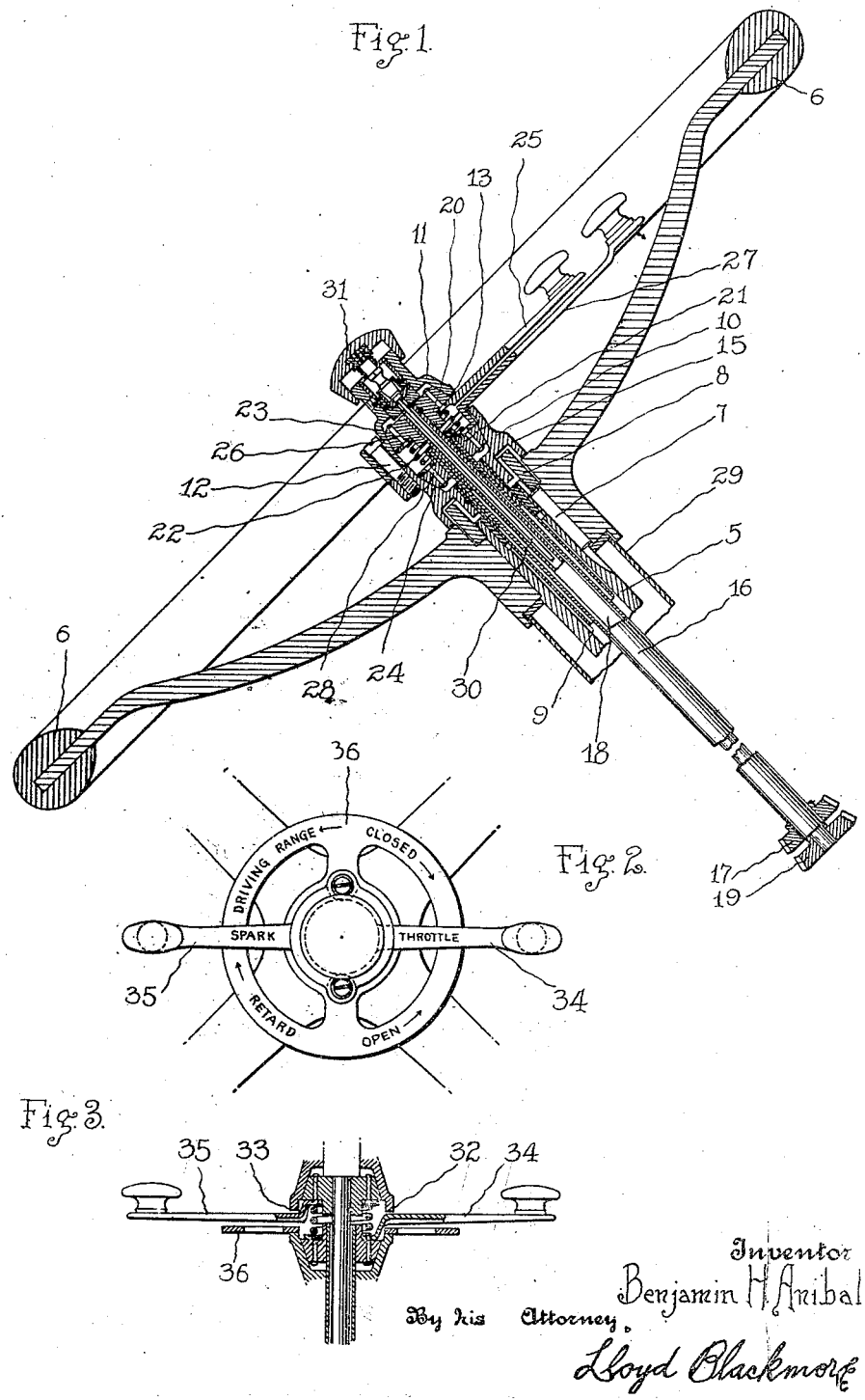

UNITED STATES PATENT OFFICE.

BENJAMIN H. ANIBAL, OF DETROIT, MICHIGAN.

STEERING AND CONTROL MECHANISM FOR MOTOR-VEHICLES.

1,324,782.
Specification of Letters Patent.
Patented Dec. 16, 1919.

Application filed May 5, 1919. Serial No. 294,772.

*To all whom it may concern:*

Be it known that I, BENJAMIN H. ANIBAL, a citizen of the United States, and resident of Detroit, Wayne county, State of Michigan, have invented certain new and useful Improvements in Steering and Control Mechanism for Motor-Vehicles, of which the following is a specification.

My invention relates to combined steering and control mechanism designed for use with self-propelled vehicles to steer the same and to control the operation thereof in whole or in part, and particularly to mechanism of the class referred to in which a plurality of concentrically arranged control members are located within a tubular steering post, and are operatively connected with the throttle valve and with the ignition regulating mechanism of a motor vehicle propelled by an internal combustion engine; said control members being operable by levers or arms operatively connected with them and disposed adjacent the steering wheel secured to the upper end of the steering post.

The principal object of my invention is to provide certain improvements in and relating to steering and control mechanism of the type above referred to and wherein the control members are held in the positions into which they may be moved by frictional engagement between surfaces pressed against one another by a suitable spring and whereby a smoother and more reliable operation of said members is secured.

A further object of my invention is to provide a steering and control device of the class described wherein the friction elements associated with the control members are located within a stationary casing arranged centrally of the steering wheel, and which casing serves to cover or inclose the nut or equivalent securing member whereby the steering wheel is held in place upon the upper end of the steering post.

With the above and other objects of invention in view, my invention consists in the improved steering and control mechanism illustrated in the accompanying drawing and hereinafter described and claimed, and in such modifications and variations thereof as will be obvious to those skilled in the art to which my invention relates. In the drawing accompanying and forming part of this specification and wherein the preferred embodiment of my invention is illustrated:

Figure 1 is a view showing the upper portion of my improved steering and control mechanism in section;

Fig. 2 is a fragmentary view showing my invention as modified in certain particulars; and, Fig. 3 is a view showing a section of the form of my invention shown in Fig. 2.

Referring to the drawing, the reference numeral 5 designates a tubular steering post rotatable about a longitudinally extending axis through various angles to accomplish the steering of the vehicle and the lower end of which is supported in bearings provided in a suitable steering gear casing, and which steering post is operatively connected with a worm whereby a worm gear is operated through which motion is communicated to the wheels of the vehicle. These elements, however, are not illustrated, as they form no part of the invention to which this present application relates; and said elements may be of any form suitable for the transmission of movement from the steering post to the wheels of the vehicle.

Secured to the upper end of the steering post 5 is a steering wheel 6, the same being shown as secured in place by a key 7 fitting in keyways provided in the hub of the wheel and in the steering post; a suitable nut 8 being shown as in threaded engagement with the upper extremity of the post to thereby more effectively secure the wheel in place.

Arranged within and extending longitudinally of the steering post 5 is a stationary anchoring tube 9 the lower end of which is held in a bearing provided for it in the steering gear casing, and the upper end of which anchoring tube supports a suitable stationary casing shown as made up of two parts 10, 11 secured together to thereby provide a unitary casing by means of screws, one of which is designated by the reference numeral 12 in Fig. 1. This casing is provided with a slot 13 through which operating levers for the controlling members of the device extend, as shown in Fig. 1, the length of said slot being such that the levers may be moved throughout the angles necessary in order to provide for the regulation of the operating motor of the vehicle, as will hereinafter appear. The casing is located adjacent the steering wheel, and is provided with a depending flange 15 which fits over and incloses the nut 8 and protects the same and prevents access thereto, the casing as a whole thus forming a stationary element at the upper end of the steering post and presenting a neat and finished appearance to the device as a whole.

The reference numeral 16 designates an angularly adjustable tubular control member located within and extending along the anchoring tube 9 and the lower end of which is operatively connected in any suitable way, as through a gear 17, with an element or mechanism having to do with the controlling of the motor whereby the vehicle is driven; the said tube being operatively connected with the spark control element of the igniting mechanism of an internal combustion engine to vary the point at which ignition occurs in the embodiment of my invention illustrated. A second angularly adjustable controlling member 18 is shown as located within and extending along the tubular member 16, said second controlling member being operatively connected with the throttle valve of the carbureter used with an internal combustion engine through and by means of suitable operating mechanism with which a gear 19 at the lower end of said last mentioned controlling member engages, in the embodiment of my invention illustrated.

It will, of course, be appreciated that this present invention has nothing to do with the manner in which the elements of the engine or motor are operated through and by means of the control members 16, 18 above referred to, for which reason the details of the mechanism whereby the said members are operated are not illustrated or described herein.

Secured to the upper end of the inner controlling member 18 is a friction member 20, and a similar friction member 21 is secured to the upper end of the outer controlling member 16. These friction members coöperate with and are adapted to be forced into engagement with friction surfaces with which the stationary casing made up of the parts 10, 11 as above pointed out is provided by means of a suitable spring, as by means of the spring at 22 concentric with the axis of the device as a whole, and which acts between and against the friction members to force them apart and against the friction surfaces aforesaid.

The friction members referred to are preferably conical in form, as shown, and the friction surfaces of the casing are shown as likewise conical to conform with the peripheries of the friction members 20, 21; said friction surfaces being designated by the reference numerals 23, 24, and the same being located within the stationary casing above referred to in the embodiment of my invention illustrated.

It will be appreciated that the spring 22 will force the friction members 20, 21 apart, and into frictional engagement with the friction surfaces 23, 24 against which they bear; thereby securing a smooth operation of the controlling members above referred to, and providing adjusting mechanism which will operate smoothly and without noise, and in which the parts will be held in the positions into which they may be moved by frictional engagement between surfaces in contact with one another.

The inner controlling mechanism 18 is operated by means of an arm or lever 25 operatively connected therewith, said lever being secured to the friction member 20 in the form of my invention illustrated by means of suitable rivets 26; while the outer control member 16 is operated through and by means of the lever or arm 27 operatively connected therewith as by means of rivets 28, whereby the inner end of said arm is secured to the friction member 21.

The steering post 5 is preferably inclosed within a stationary housing tube 29, although it will be appreciated that this is a feature which may or may not be used in any particular steering and control mechanism; and the inner control member 18 is preferably tubular, in order to accommodate a reciprocating rod 30 operated by a push button 31 secured to its outer end and located centrally of the steering column, and by means of which rod the horn of the vehicle or other device may be operated from the steering post or steering wheel.

In the form of my invention shown in Fig. 1 the control levers or arms 25, 27 are located both to one side of the axis of the steering column, and both extend through one and the same slot in the stationary casing above referred to. In the form of my invention shown in Figs. 2 and 3, however, the casing within which the friction mechanism is located is provided with oppositely disposed slots 32, 33 through which the operating levers 34, 35 extend in directions opposite one to the other; the said arms being operatively connected with control members the same as in the form of my invention shown in Fig. 1. Furthermore, in this last mentioned form of my invention a ring 36 is carried by the casing, and is provided with suitable legend to indicate the operation of the control levers, the ring being shown as secured in place between the two halves of the casing within which the frictional mechanism is located.

Having thus described and explained my invention, I claim and desire to secure by Letters Patent:

1. In steering and control mechanism of the class described and in combination with a tubular steering post having a steering wheel at its upper end, a stationary anchoring tube within and extending along said steering post; a casing secured to the upper end of said anchoring tube and located adjacent said steering wheel and having a depending flange terminating adjacent the hub thereof, said casing having two internal conical friction surfaces concentric with the axis of the steering post and the anchoring tube; a tubular control member located within and extending along said anchoring tube; a second control member located within and extending along said tubular control member; two conical friction members located within said casing and secured one to the upper end of each of said control members; two operating arms one of which is operatively connected with each of said friction members; and a spring located between and acting upon said friction members to force them against the friction surfaces aforesaid within said casing.

2. In steering and control mechanism of the class described and in combination with a tubular steering post having a steering wheel at its upper end, a stationary anchoring tube within and extending along said steering post; a casing secured to the upper end of said anchoring tube and having two internal friction surfaces spaced apart from one another and concentric with the axis of said steering post and anchoring tube; a tubular control member located within and extending along said anchoring tube; a second control member located within and extending along said tubular control member; two friction members located within said casing and secured one to the upper end of each of said control members; two operating arms one of which is operatively connected with each of said control members; and a spring located between and acting upon said friction members to force them apart, and into engagement with the friction surfaces aforesaid of said casing.

3. In steering and control mechanism of the class described and in combination with a tubular steering post having a steering wheel at its upper end, a stationary anchoring tube within and extending along said steering post; a casing secured to the upper end of said anchoring tube and having two friction surfaces; a tubular control member located within and extending along said anchoring tube; a second control member located within and extending along said tubular control member; two friction members secured one to the upper end of each of said control members; two operating arms one of which is operatively connected with each of said control members; and a spring acting upon said friction members to force them against the friction surfaces aforesaid of said casing.

4. In steering and control mechanism of the class described and in combination with a tubular steering post having a steering wheel at its upper end, a stationary anchoring tube within and extending along said steering post; a casing secured to the upper end of said anchoring tube and having two friction surfaces; a tubular control member located within and extending along said anchoring tube; a second tubular control member located within and extending along said tubular control member; two friction members secured one to the upper end of each of said control members; two operating arms one of which is operatively connected with each of said control members; a spring acting upon said friction members to force them against the friction surfaces aforesaid of said casing; a third control member located within and extending along said second mentioned control member; and an operating member at the upper end of said casing and which operating member is operatively connected with said last mentioned control member.

5. In steering and control mechanism of the class described and in combination with a tubular steering post having a steering wheel at its upper end, a stationary anchoring tube within and extending along said steering post; a casing secured to the upper end of said anchoring tube and having two internal friction surfaces spaced apart from one another and concentric with the axis of said steering post and anchoring tube; a tubular control member located within and extending along said anchoring tube; a second tubular control member located within and extending along said tubular control member; two friction members located within said casing and secured one to the upper end of each of said control members; two operating arms one of which is operatively connected with each of said control members; a spring located between and acting upon said friction members to force them apart and into engagement with the friction surfaces aforesaid within said casing; a third control member located within and extending along said second mentioned control member; and an operating member at the upper end of said casing and which operating member is operatively connected with said last mentioned control member.

6. In steering and control mechanism of the class described and in combination with a tubular steering post having a steering wheel at its upper end, a stationary anchoring tube within and extending along said steering post; a casing secured to the upper end of said anchoring tube and located adjacent said steering wheel and having a depending flange terminating adjacent the hub thereof, said casing having an internal conical friction surface concentric with the axis of the steering post and the anchoring tube; a control member located within and extending along said anchoring tube; a conical friction member located within said casing and secured to the upper end of said control member; an operating arm operatively connected with said friction member; and a spring acting upon said friction member to force it against the friction surface aforesaid within said casing.

7. In steering and control mechanism of the class described and in combination with a tubular steering post having a steering wheel at its upper end, a stationary anchoring tube within and extending along said steering post; a casing secured to the upper end of said anchoring tube and having an internal friction surface concentric with the axis of said steering post and anchoring tube; a control member located within and extending along said anchoring tube; a friction member located within said casing and secured to the upper end of said control member; an operating arm operatively connected with said control member; and a spring acting upon said friction member to force the same into engagement with the friction surface aforesaid within said casing.

8. In steering and control mechanism of the class described and in combination with a tubular steering post having a steering wheel at its upper end, a stationary anchoring tube within and extending along said steering post; a casing secured to the upper end of said anchoring tube and having a friction surface; a control member located within and extending along said anchoring tube; a friction member secured to the upper end of said control member; an operating arm operatively connected with said control member; and a spring acting upon said friction member to force the same against the friction surface aforesaid of said casing.

9. In steering and control mechanism of the class described and in combination with a tubular steering post having a steering wheel at its free end, a stationary anchoring tube within said steering post; a stationary member adjacent said steering wheel and secured to the end of said anchoring tube, and which member is provided with a friction surface; a control member located within said anchoring tube; a friction member secured to the end of said control member and located adjacent said steering wheel; means for moving said control member angularly; and a spring acting upon said friction member to force it against the friction surface aforesaid.

In testimony whereof I affix my signature.

BENJAMIN H. ANIBAL.